(12) United States Patent
Kale et al.

(10) Patent No.: US 10,300,898 B2
(45) Date of Patent: May 28, 2019

(54) CART AND IMPLEMENT COMBINATION HAVING A BRAKE SYSTEM

(71) Applicant: Deere & Company, Moline, IL (US)

(72) Inventors: Mandar Kale, Pune (IN); Trond Svidal, Crestwood, KY (US); Douglas Graham, East Moline, IL (US); Derryn W. Pikesh, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/412,775

(22) Filed: Jan. 23, 2017

(65) Prior Publication Data

US 2018/0206395 A1    Jul. 26, 2018

(51) Int. Cl.

| | |
|---|---|
| *B60T 8/17* | (2006.01) |
| *F16D 55/225* | (2006.01) |
| *F16D 66/00* | (2006.01) |
| *B60T 7/20* | (2006.01) |
| *B60T 13/66* | (2006.01) |
| *F16D 65/18* | (2006.01) |
| *A01C 7/20* | (2006.01) |

(52) U.S. Cl.
CPC .............. *B60T 8/1708* (2013.01); *B60T 7/20* (2013.01); *B60T 13/662* (2013.01); *F16D 55/225* (2013.01); *F16D 65/183* (2013.01); *F16D 66/00* (2013.01); *A01C 7/208* (2013.01)

(58) Field of Classification Search
CPC .......... B60T 8/17; B60T 8/1708; B60T 8/171; B60T 8/172; B60T 17/221

USPC .......................................................... 303/7, 20
See application file for complete search history.

(56) References Cited

U.S. PATENT DOCUMENTS

| | | | | |
|---|---|---|---|---|
| 4,591,213 | A * | 5/1986 | Rapoport | B60T 8/00 188/106 P |
| 5,136,508 | A | 8/1992 | Bannon et al. | |
| 5,806,938 | A * | 9/1998 | Stumpe | B60T 8/00 303/113.4 |
| 6,349,997 | B1 * | 2/2002 | Unterforsthuber | B60T 8/172 188/1.11 E |
| 6,595,601 | B2 * | 7/2003 | Sauter | B60T 8/175 303/140 |
| 6,705,684 | B1 * | 3/2004 | Garvey | B60T 7/20 188/112 A |
| 6,805,415 | B2 * | 10/2004 | Isono | B60T 8/367 303/122.03 |
| 6,955,408 | B1 * | 10/2005 | Schmitt | B60T 8/175 303/116.4 |

(Continued)

FOREIGN PATENT DOCUMENTS

| | | | | |
|---|---|---|---|---|
| DE | 4418768 | A1 | 12/1995 | |
| DE | 19713561 | C1 * | 5/1998 | ............. B60T 8/266 |

(Continued)

*Primary Examiner* — Thomas J Williams

(57) ABSTRACT

A towed cart and implement having a brake assembly enabled for independent application of the cart brake assembly without application of the brakes of prime mover in a burst application of the brake assembly for a predetermined duration. A brake control system includes a display which indicates the capacity of the brake assembly for burst application based on a temperature of a brake assembly component. The temperature may be measured or estimated based on duration and timing of burst brake applications.

20 Claims, 3 Drawing Sheets

(56) References Cited

U.S. PATENT DOCUMENTS

| | | | |
|---|---|---|---|
| 7,228,944 B2 | 6/2007 | Fischle et al. | |
| 2010/0063702 A1* | 3/2010 | Sabelstrom | B60T 7/20 |
| | | | 701/70 |
| 2010/0211279 A1 | 8/2010 | Lingman et al. | |
| 2016/0311280 A1* | 10/2016 | Gerbrandt | B60D 1/145 |

FOREIGN PATENT DOCUMENTS

| | | |
|---|---|---|
| DE | 10012448 A1 | 10/2001 |
| DE | 10157449 A1 | 6/2003 |
| EP | 1083360 A3 | 3/2003 |
| EP | 2101077 A1 | 9/2009 |
| ES | 2169667 A1 | 7/2002 |
| GB | 2515181 A | 12/2014 |

\* cited by examiner

CART AND IMPLEMENT COMBINATION HAVING A BRAKE SYSTEM

BACKGROUND

Towed carts and trailers are often equipped with a brake assembly that can be applied independently of the brakes on a prime mover or tractor towing the cart or trailer. A need exists to improve such brake assembly to avoid over heating of the brake assembly due to excessive application of the brake assembly while the cart or trailer is being towed.

SUMMARY

A towed cart and implement having a brake assembly on an axle of the cart enabled for independent application of the cart brake assembly without application of the brakes of a prime mover in a burst application of the brake assembly for a predetermined duration. A brake control system includes a display which indicates the capacity of the brake assembly for burst application based on a temperature of a brake assembly component. The temperature may be measured or estimated based on duration and timing of burst brake applications.

DETAILED DESCRIPTION

Figure 1:
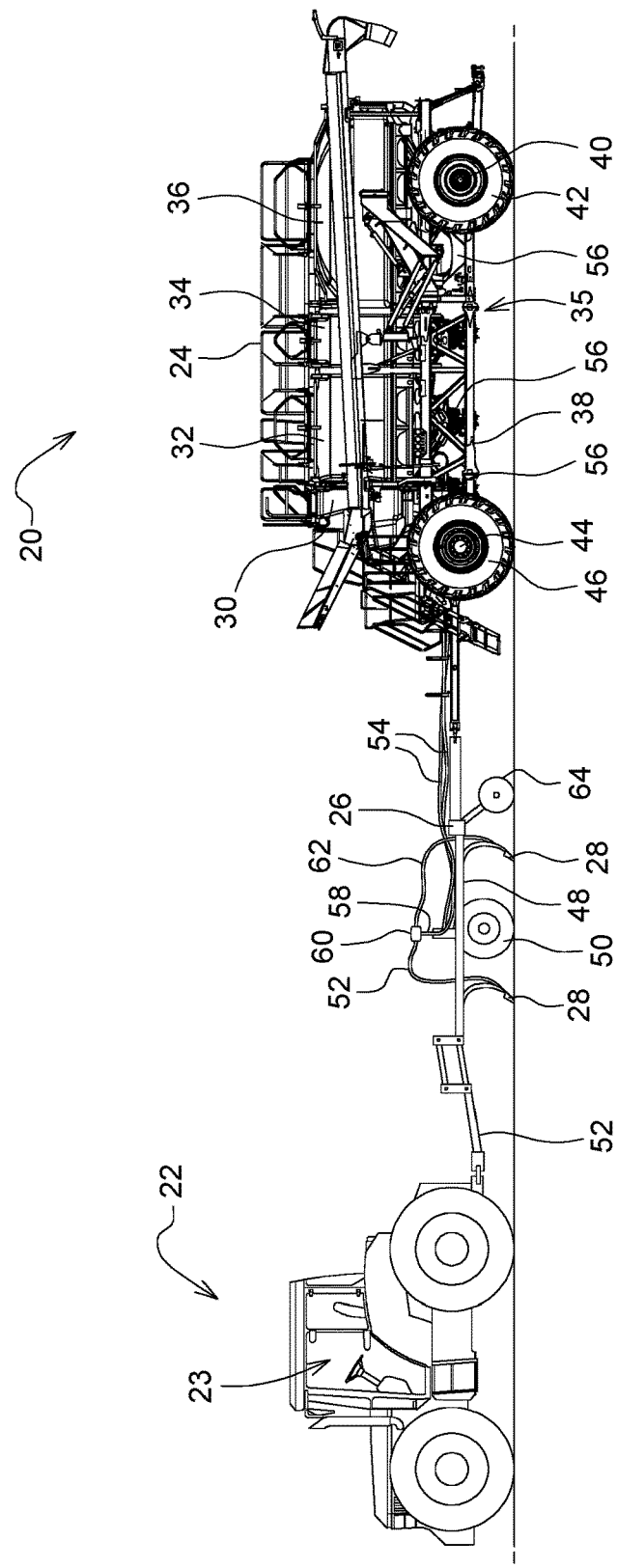
FIG. 1 is a side view of a towed cart and prime mover along with an attached implement.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the air cart frame 38 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan, not shown, but located behind the front tires 46, connected to a product delivery conduit structure having multiple product flow passages 54. The fan directs air through the passages 54. A product meter assembly 56 is located at the bottom of each tank and delivers product from the tanks at a controlled rate to the passages 54 and the air stream moving through the passages 54.

Each passage 54 carries product in the air stream to a secondary distribution tower 58 on the drill 26. Typically, there will be one tower 58 for each passage 54. Each tower 58 includes a secondary distributing manifold 60 located at the top of a vertical tube. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of passages 54 may vary from one to eight or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

What has been described above are common air seeder systems such as those made and sold by John Deere, CNH, Bourgault, Seed Hawk, Seed Master, Morris, etc. The invention claimed below is applicable to all such air seeders.

Figure 2:
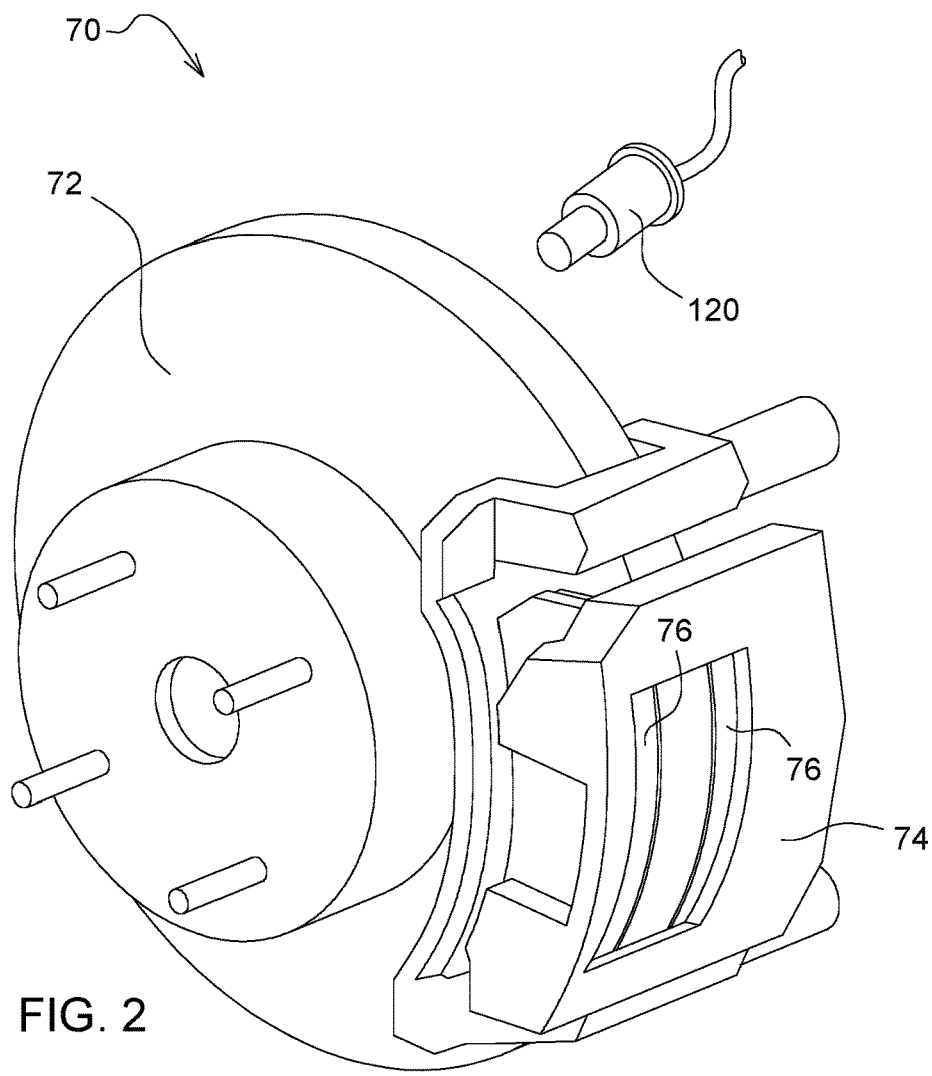
FIG. 2 is a perspective view of a brake assembly on an axle of the cart of FIG. 1.

Rear axle 40 of the cart is provided with a friction brake assembly 70 including a brake rotor 72 and caliper assembly 74 with brake pads 76 shown in FIG. 2. Other brake types may be used such as a drum and brake shoes, etc. The brake assembly may be applied upon actuation of the brakes on tractor 22. However, there are situations when it is desired to apply the brake assembly on the cart while not braking the tractor. One such situation is when traveling downhill in the field and approaching the end of the row. At the end of the row, the tools 28 are lifted from the ground for turning of the seeder for the next pass. The tools generate a significant draft load when they are in the soil. This load also resists the pull of gravity on the cart when traveling downhill. When the tools are raised for the turn, however, this resistance from the draft load is eliminated, allowing the cart to push on the drill and tractor in a tow behind configuration, or allowing the cart to push on the tractor in a tow between configuration. To prevent this pushing, a brake control system 80 enables short duration actuation of the brake assembly in what is referred to as "burst application" of the brake assembly independent of the tractor brakes.

Figure 3:
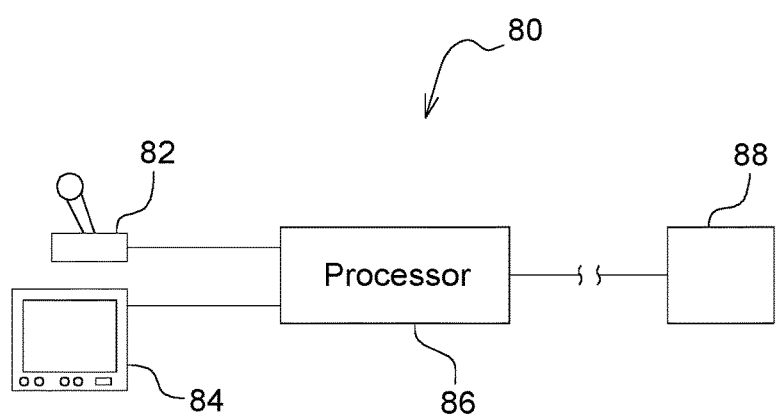
FIG. 3 is a schematic diagram of a brake control system.

The brake control system 80 includes an input device 82, a display 84, and a programmable processor 86. The input device 82 is shown in FIG. 3 as a mechanical push button. Other mechanical devices may be used such as a switch, button, actuator, knob, lever, pedal, etc. Alternatively, the display may be a touch screen such that an appropriate symbol on the display represents a button to be pressed as the input device. The programmable processor 86 is connected to the display and input device and may be packaged with the display in a common case. The display and the input device, if separate from the display, may both be mounted in the operator station 23 of the tractor 22

When the input device 82 is activated, the control system 80 actuates burst application of the cart brake assembly. The processor may be programmed such that the burst application is for a predetermined duration, for example, 5 or 10 seconds in duration. Alternatively, the processor may be programmed to apply the brake assembly as long as the input device is activated, i.e., pushed or held, up to a predetermined maximum duration. In either scenario, after the predetermined duration, the operator may again activate the input device and actuate the brake assembly, provided the brake assembly has capacity for burst braking, as detailed below.

As with any friction brake system, application of the brake assembly generates heat in the brake components, such as the rotor 72. If excessive heat is generated, the rotor and brake pads may be damaged, reducing the braking ability of the brake assembly. Such overheating may occur if the cart brake assembly is continuously applied while the seeder is being pulled through the field by the tractor 22. The burst application of the brake assembly for a predetermined duration avoids continuous application of the brake assembly while the seeder is being pulled through the field.

Figure 4A:
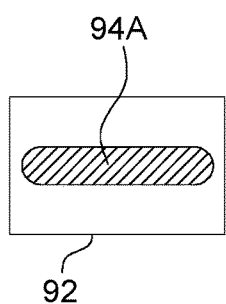
FIGS. 4A, 4B, 4C and 4D are plan views of icons for indicating the capacity of the brake assembly.
Figure 4B:
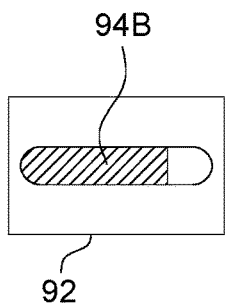
Figure 4C:
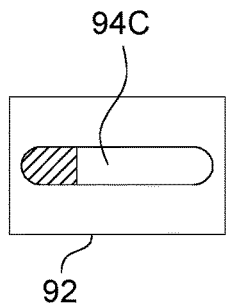
Figure 4D:
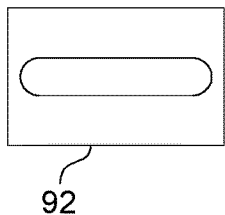

To prevent overheating of the brake assembly from too frequent application of burst braking, the control system 80 is programmed to only allow burst braking when the temperature of a component of the brake assembly is below a certain level. Furthermore, the display 84 indicates to the operator the current capacity of the brake assembly for burst application of the brake assembly. The brake burst application current capacity may be shown by a type of level indicator, like a fuel level gauge, ranging from maximum capacity to no capacity. One way to do so is with a bar of varying length. For example, a full length bar represents maximum capacity. The shorter the bar, the less the capacity. With reference to FIGS. 4A, 4B, 4C, and 4D, a brake capacity icon 92 is shown with a bar 94. In FIG. 4A the bar 94 is full length representing full capacity. In FIG. 4B the bar 94 is somewhat shorter showing a reduced capacity. In FIG. 4C the bar 94 is shorter yet and in FIG. 4D the bar 94 is non-existent, representing no capacity for burst application of the brake assembly. The bar may further change color to also represent the brake capacity. For example, the bar 94 of FIG. 4A may be green, the bar 94 of FIG. 4B may be yellow and the bar 94 of FIG. 4C may be red.

Figure 5:
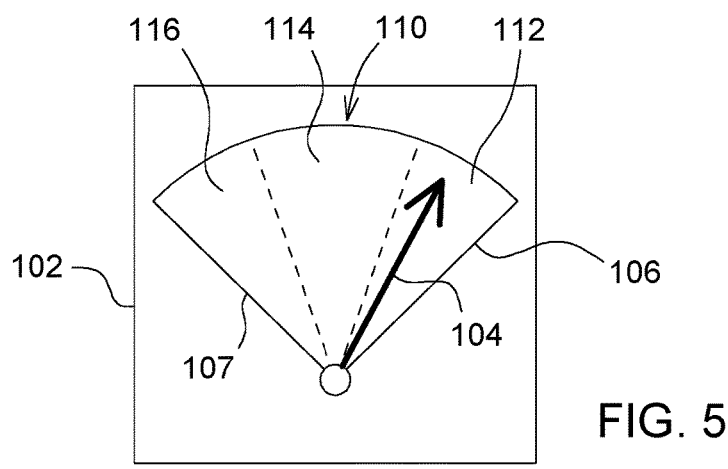
FIG. 5 is a plan view of an alternative icon for display indicating the capacity of the brake assembly.

The brake capacity may also be shown with a needle gauge display, as shown in FIG. 5. There, the icon 102 shows a needle 104 that can move between a maximum capacity 106 and a minimum capacity 108. The background area 110 may change colors based on the capacity as a further visual indication to the operator. Alternatively, the background area 110 may have different zones 112, 114, and 116 each colored differently.

Figure 6A:
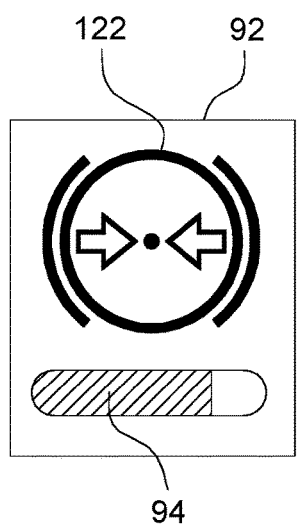
FIGS. 6A, 6B and 7 are plan views of additional icons for display indicating information about the brake assembly.
Figure 6B:
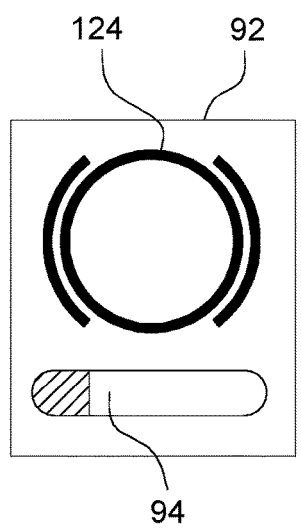
Figure 7:
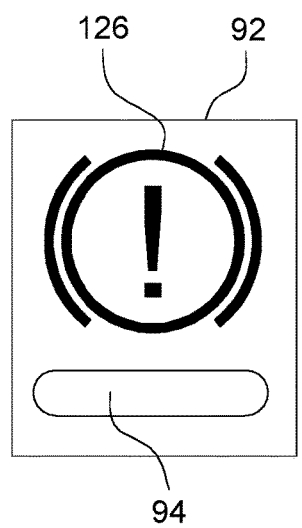

Along with a display of brake capacity, the display 84 can also indicate the current status of the brake system. With reference to FIG. 6A, the icon 92 shows the brake assembly as currently being applied with a symbol 122 along with the capacity bar 94. FIG. 6B shows the brake assembly not being applied with the symbol 124 along with the capacity bar 94. A red brake symbol 126 in FIG. 7 indicates a brake failure or fault. This may occur due to a brake malfunction, such as loss of fluid pressure, electrical disconnection between the processor and the hydraulic controller 88, etc., requiring immediate attention. A loss of fluid pressure may be detected by the hydraulic controller 88 and a signal sent to the brake control system 80.

The processor 86 determines the capacity for burst application of the brake assembly based on the temperature of a brake component, such as the rotor 72. As shown in FIG. 2, a non-contact infra-red temperature sensor 120 is shown as part of the brake control system 80 and is coupled to the processor 86. The sensor 120 is positioned and oriented to measure the temperature of the rotor 72. The temperature of other brake components can be measured if desired such as the caliper assembly 74 or the brake pads 76. Other temperature sensors may be used including a contact thermocouple. The sensor may be connected by a CAN bus or analog or may be wired to the brake control system 80 or connected wirelessly.

The temperature may be estimated, as opposed to measured, to eliminate the need for the sensor 120 and associated wiring harness. Temperature of the brake rotor may be estimated based on the brake load and the duration and timing of burst brake application as follows, where the brake power is the brake load.

The brake power as a function of time, P(t), is equal to braking force times speed. This is represented by the equation:

$$P(t) = n * \mu * BP(t) * A * r/R * V(t)$$

Where:
n=number of brake pads
μ=friction coefficient between brake pad and rotor
BP(t)=brake pressure as a function of time
A=caliper piston area
r=radius from the center axis to brake pads
R=tire radius
V(t)=speed as a function of time This is the energy that is going into the brake rotor per second. This can easily be estimated if the friction coefficient is assumed to be constant within the temperature range in which the brake assembly is operated.

The change in temperature of the rotor upon application of the brake assembly is determined by the following equation:

$$\Delta T/s = P(t)/(mc)$$

Where:
ΔT/s=temperature increase per second
P(t)=brake power as a function of time
m=mass of the rotor (only the mass where the pads rub)
c=specific heat The change in temperature is added to the ambient temperature to achieve a rotor temperature. During times when the brake is not applied, the rotor will undergo cooling. This is a function of the rotor surface area, the surface condition, and material properties. Newton's laws of thermodynamics allow for prediction of a cooling curve. The temperature increase during brake application together with the cooling between brake applications allows the processor to calculate an estimated brake rotor temperature. The maximum brake temperature at which burst braking capacity remains is substantially lower than the temperature at which the brake components are susceptible to damage. This allows for cart brake application upon actuation of the tractor brakes to slow or stop the entire machine, i.e., the prime mover, the cart, and any implement, regardless of the ability for burst brake application. Burst brake application is for application of the cart brake assembly only, while the entire machine is being propelled by the prime mover. When the prime mover brakes are being applied, it is to slow or stop the entire machine. Once the machine is stopped, there will be no additional heating of the brake assembly. The limits on burst application of the cart brake assembly, without application of the prime mover brakes, is to limit the temperature of the brake assembly. If allowed to apply the cart brake assembly continuously, while towing the cart, the brake temperature would continue to rise without limit, causing overheating of the brake assembly.

Having described the cart and brake system, it will become apparent that various modifications can be made without departing from the scope of the invention as defined in the accompanying claims.

What is claimed is:

1. A brake system for a cart towed by a prime mover comprising:
    a friction brake assembly having a brake rotor and calipers; and
    a brake control system having:
        a programmable processor;
        an input device; and
        a display, wherein the control system actuates burst application of the brake assembly upon activation of the input device, wherein burst application of the brake assembly comprises repeated short-duration actuation of the brake assembly, and further indicates on the display a current capacity of the brake assembly for burst application of the brake assembly and whether or not there is capacity in the brake assembly for any burst application of the brake assembly.

2. The brake system of claim 1 wherein the control system determines current brake capacity for burst application of the brake assembly based on a temperature of a component of the brake assembly.

3. The brake system of claim 2 wherein the component of the brake assembly is the brake rotor.

4. The brake system of claim 2 wherein the temperature of the brake component is estimated based on a brake load and the duration and timing of burst brake application.

5. The brake system of claim 2 wherein the temperature of the brake component is measured by a temperature sensor.

6. The brake system of claim 1 wherein the current brake capacity for burst application of the brake assembly is displayed by a bar of varying length.

7. The brake system of claim 6 wherein the longer the bar, the greater is the current brake capacity for burst application.

8. The brake system of claim 6 wherein the bar is shown in different colors depending on the current brake capacity for burst application.

9. The brake system of claim 1 wherein the display indicates whether or not the brake assembly is currently being applied.

10. The brake system of claim 1 wherein the display indicates a brake fault.

11. The brake system of claim 1 wherein the burst application of the brake assembly is for a predetermined duration.

12. A method of controlling a brake assembly of a towed cart, the cart having a frame, an axle with wheels upon which the frame is supported for movement over a ground surface, a brake assembly on the axle and brake control system having an input device and a display, the method comprising the steps of:
    activating the input device;
    actuating burst application of the brake assembly upon activation of the input device, wherein burst application of the brake assembly comprises repeated short-duration actuation of the brake assembly; and
    indicating on the display a current capacity of the brake assembly for burst application of the brake assembly and whether or not there is capacity in the brake assembly for any burst application of the brake assembly.

13. The method of claim 12 further comprising the steps of:
    determining a temperature of a component of the brake assembly; and
    calculating the current capacity of the brake assembly for burst application of the brake assembly based on the determined temperature of the component of the brake system.

14. The method of claim 13 wherein the temperature of the component of the brake system is determined by measuring the temperature with a sensor.

15. The method of claim 12 wherein the temperature of the component of the brake system is determined by calculation based on load and the duration and timing of burst application of the brake assembly.

16. A machine comprising:
    a commodity cart having a frame and a cart axle with wheels upon which the frame is supported for movement over a ground surface;
    an implement configured to be coupled to the cart for movement together with the cart, the implement having a plurality of ground engaging tools movable between a lowered position engaging the ground and raised position above the ground;
    a friction brake assembly on the cart axle; and
    a brake control system having a programmable processor, an input device and a display, the control system actuating burst application of the brake assembly upon activation of the input device, wherein burst application of the brake assembly comprises repeated short-duration actuation of the brake assembly, and indicating on the display a current capacity of the brake assembly for burst application of the brake assembly and whether or not there is capacity in the brake assembly for any burst application of the brake assembly.

17. The machine of claim 16 wherein the control system determines current brake capacity for burst application of the brake assembly based on a temperature of a brake rotor.

18. The machine of claim 17 wherein the temperature of the brake component is estimated based on a brake load and the duration and timing of burst brake application.

19. The machine of claim 18 wherein the temperature of the brake rotor is based on the brake load, and the duration and timing of burst application of the brake assembly.

20. The machine of claim 17 wherein the temperature of the brake rotor is measured by a temperature sensor.

* * * * *